(12) United States Patent
Hecht

(10) Patent No.: US 8,157,486 B2
(45) Date of Patent: *Apr. 17, 2012

(54) CUTTING TOOL AND CUTTING INSERT THEREFOR

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 0 days.

This patent is subject to a terminal disclaimer.

(21) Appl. No.: 13/204,457

(22) Filed: Aug. 5, 2011

(65) Prior Publication Data

US 2011/0286809 A1 Nov. 24, 2011

Related U.S. Application Data

(63) Continuation of application No. 12/414,824, filed on Mar. 31, 2009, now Pat. No. 8,021,084.

(30) Foreign Application Priority Data

May 13, 2008 (IL) .......................... 191415

(51) Int. Cl.
*B23C 5/00* (2006.01)
*B23B 27/16* (2006.01)
(52) U.S. Cl. ............................ 407/5; 407/103
(58) Field of Classification Search ................. 407/2, 5, 407/66, 102, 103, 106, 107, 109, 113–116
See application file for complete search history.

(56) References Cited

U.S. PATENT DOCUMENTS

| | | | | |
|---|---|---|---|---|
| 3,125,798 A | * | 3/1964 | Stein | 407/83 |
| 5,947,648 A | | 9/1999 | Friedman et al. | |
| 6,132,146 A | | 10/2000 | Satran et al. | |
| 6,168,356 B1 | * | 1/2001 | Sjoo et al. | 407/104 |
| 6,733,215 B2 | * | 5/2004 | Isaksson | 407/114 |
| 7,090,443 B2 | | 8/2006 | Hecht et al. | |
| 7,597,508 B2 | * | 10/2009 | Hecht | 407/101 |
| 7,887,266 B2 | * | 2/2011 | Hecht | 407/46 |
| 2006/0239786 A1 | | 10/2006 | Hecht et al. | |
| 2007/0122242 A1 | | 5/2007 | Englund et al. | |
| 2009/0035076 A1 | | 2/2009 | Hecht | |

FOREIGN PATENT DOCUMENTS

FR 1 442 774 6/1966

OTHER PUBLICATIONS

International Search Report in PCT/IL2009/000427, dated Aug. 24, 2009.

* cited by examiner

*Primary Examiner* — Will Fridie, Jr.

(74) *Attorney, Agent, or Firm* — Womble Carlyle

(57) ABSTRACT

A cutting tool has a cutting insert retained within an insert pocket of an insert holder by a retaining screw. Spaced apart first insert rear abutment surfaces abut spaced apart first pocket rear abutment surfaces, a second insert rear abutment surface abuts a second pocket rear abutment surface, and spaced apart insert lower abutment surfaces abut spaced apart pocket lower abutment surfaces. The cutting insert has a first dimension taken between extremities of the insert side surfaces, a second dimension taken between extremities of the insert upper and lower surfaces, and, a fourth dimension taken between the insert lower abutment surfaces and the insert upper surface. The size ratio between the fourth dimension and the second dimension is in the range of 0.2 to 1, and, preferably, in the range of 0.55 to 0.6. The size ratio between the first dimension and the second dimension is in the range of 1 to 2.

25 Claims, 6 Drawing Sheets

CUTTING TOOL AND CUTTING INSERT THEREFOR

RELATED APPLICATIONS

This is a Continuation of U.S. patent application Ser. No. 12/414,824, filed Mar. 31, 2009, now U.S. Pat. No. 8,021,084. The contents of the aforementioned parent application are incorporated by reference in their entirety.

FIELD OF THE INVENTION

The present invention relates to cutting tools of the type in which a cutting insert is retained in an insert pocket of an insert holder by means of a retaining screw for performing a shaving operation.

BACKGROUND OF THE INVENTION

In cutting tools for grooving, turning or parting-off, and in cutting tools for rotary slot cutting, a cutting insert is often retained in an insert pocket between two generally opposing jaws. In these tools, chips flowing from the cutting insert's cutting edge along its rake surface during a cutting operation may engage the jaw adjacent the rake surface and subject it to considerable abrasive wear. This disadvantageous effect will in time reduce the jaw's ability to retain the cutting insert within the insert pocket.

One solution which significantly overcomes this disadvantageous effect is disclosed in U.S. Pat. No. 5,947,648 to Friedman et al. A tool holder includes a holder blade having an upper jaw and a base jaw wherein the upper jaw is fitted with an exchangeable head material shield insert for protecting it against wear. However, this introduces additional maintenance of the tool.

Another solution is disclosed in U.S. Pat. No. 7,090,443 B2 to Hecht. A cutting insert is retained in an insert pocket of a cutting tool by means of a retaining screw. The lower surface of the cutting insert comprises a pair of insert lower faces which extend rearwardly from the forward surface at an external non-acute insert lower angle to each other. The lower abutment surface of the insert pocket comprises a pair of lower faces which extend forwardly from the pocket recess at an internal holder lower angle to each other. The internal holder lower angle is equal or slightly smaller than the external insert lower angle.

Lateral stability of the cutting insert relative to the insert holder is provided by the lower and rear surfaces of the cutting insert having generally V-shape concave (or convex) cross sections, which mate corresponding generally V-shape convex (or concave) cross sections of the lower and rear abutment surfaces of the insert pocket.

There are several types of shaving tools in the market. A first kind of shaving tool is made of a solid block of HSS that is retained by a dedicated mechanism. The hardness and tool life of such a tool may be limited for some applications.

Another kind of shaving tool is made of a solid block of cemented carbide that is retained by a dedicated mechanism. Despite the advantages of using a cemented carbide block, it is relatively expensive and requires re-grinding after becoming worn.

Another kind of shaving tool comprises a cemented carbide flat plate that is retained in position by a clamping arm. Such kind of tool requires a time consuming process of alignment in position. Furthermore, after becoming worn, the plate has to be re-grinded and than be re-aligned in its position.

SUMMARY OF THE INVENTION

In accordance with the present invention there is provided a cutting insert comprising:

an insert forward surface, an opposing insert rear surface and an insert peripheral surface extending therebetween, the insert peripheral surface comprising two opposing insert side surfaces that extend between an insert upper surface and an opposing insert lower surface, the insert upper surface and the insert lower surface forming insert end surfaces, a through bore having a bore axis and extending between the insert forward and rear surfaces, a forward cutting edge formed at an intersection of the insert upper surface and the insert forward surface;

the insert rear surface comprising:

a first portion located between the through bore and the insert lower surface, the first portion comprising an insert engaging element that extends in a direction between the insert end surfaces and comprises two spaced apart first insert rear abutment surfaces, and a second portion located between the through bore and the insert upper surface, the second portion comprising a second insert rear abutment surface;

the insert lower surface comprising:

an insert lower central portion adjacent the insert engaging element, and a pair of insert lower flanks extending from the insert lower central portion to the insert side surfaces, each of the insert lower flanks being provided with an insert lower abutment surface.

According to a general overview of the cutting insert, the cutting insert has a first dimension taken between extremities of the insert side surfaces, a second dimension taken between extremities of the insert upper surface and the insert lower surface, a third dimension taken between extremities of the insert forward surface and the insert rear surface, a fourth dimension taken between the insert lower abutment surfaces and the insert upper surface, and a size ratio between the fourth dimension and the second dimension is in the range of 0.2 to 1.

Typically, the size ratio between the fourth dimension and the second dimension is in the range of 0.55 to 0.6.

If desired, the size ratio between the first dimension and the third dimension is in the range of 2.5 to 3.5.

Further if desired, the size ratio between the first dimension and the second dimension is in the range of 1 to 2.

Preferably, the two first insert rear abutment surfaces make an insert engaging angle with each other.

Advantageously, the insert engaging angle is obtuse.

Typically, the insert engaging angle is in the range from 90° to 150°.

If desired, the second insert rear abutment surface comprises two spaced-apart co-planar portions.

Further if desired, the second insert rear abutment surface is separated from the through bore by an insert rear intermediate surface.

According to some embodiments, the second insert rear abutment surface comprises a single continuously extending surface which extends across a width of the insert rear surface.

If desired, the second insert rear abutment surface is elevated from an insert rear intermediate surface with respect to the insert forward surface, the insert rear intermediate surface being located between the second insert rear abutment surface and the insert lower surface.
}

Further if desired, the second insert rear abutment surface is ground.

Typically, each of the insert lower abutment surfaces merges with an adjacent insert side surface.

Advantageously, the insert lower abutment surfaces are co-planar.

Further advantageously, the insert lower abutment surfaces form an acute internal insert lower angle with the second insert rear abutment surface.

Further in accordance with the present invention there is provided a cutting tool comprising an insert holder having an insert pocket with a cutting insert seated therein, wherein:

the insert holder comprises:
 a holder upper surface connecting at opposite ends to a pair of holder side surfaces;
the insert pocket comprises:
 a pocket rear surface, an upper portion of the pocket rear surface merging with the holder upper surface, side extremities of the pocket rear surface merging with the holder side surfaces,
 a pocket threaded bore formed in the pocket rear surface and extending rearwardly into the insert holder, the pocket threaded bore having a threaded bore axis,
 a pocket engaging element formed in a lower portion of the pocket rear surface and extending in an opposite direction from the holder upper surface, the pocket engaging element having two spaced apart first pocket rear abutment surfaces,
 a second pocket rear abutment surface formed in an upper portion of the pocket rear surface, the second pocket rear abutment surface merging with the holder upper surface and with the adjacent holder side surface,
 spaced apart pocket lower abutment surfaces located at opposite sides of the pocket threaded bore, each of the pocket lower abutment surfaces extending transversely to the upper portion of the pocket rear surface and merging with the holder side surfaces;
the cutting insert comprises:
 an insert forward surface, an opposing insert rear surface and an insert peripheral surface extending therebetween, the insert peripheral surface comprising two opposing insert side surfaces that extend between an insert upper surface and an opposing insert lower surface, the insert upper surface and the insert lower surface forming insert end surfaces,
 a through bore having a bore axis and extending between the insert forward and rear surfaces,
 a forward cutting edge formed at an intersection of the insert upper surface and the insert forward surface;
the insert rear surface comprising:
 a first portion located between the through bore and the insert lower surface, the first portion comprising an insert engaging element that extends in a direction between the insert end surfaces and comprises two spaced apart first insert rear abutment surfaces, and
 a second portion located between the through bore and the insert upper surface, the second portion comprising a second insert rear abutment surface;
the insert lower surface comprising:
 an insert lower central portion adjacent the insert engaging element, and
 a pair of insert lower flanks extending from the insert lower central portion to the insert side surfaces, each of the insert lower flanks being provided with an insert lower abutment surface;
the first insert rear abutment surfaces abut the first pocket rear abutment surfaces, the second insert rear abutment surface abuts the second pocket rear abutment surface, the insert lower abutment surfaces abut the pocket lower abutment surfaces, and a retaining screw passes through the through bore and threadingly engages the pocket threaded bore.

According to some embodiments, the pocket engaging element is a pocket recess.

Preferably, the first pocket rear abutment surfaces make a pocket engaging angle with each other.

Advantageously, the pocket engaging angle is obtuse.

Typically, the pocket engaging angle is in the range from 90° to 150°.

If desired, the second pocket rear abutment surface comprises two spaced-apart co-planar portions.

Further if desired, the pocket lower abutment surfaces are co-planar.

According to some embodiments, the pocket lower abutment surfaces are slanted at an acute pocket lower abutment angle with respect to the second pocket rear abutment surface.

Typically, the pocket lower abutment angle is in the range from 70° to 90°.

BRIEF DESCRIPTION OF THE DRAWINGS

For a better understanding of the present invention and to show how the same may be carried out in practice, reference will now be made to the accompanying drawings, in which.

DETAILED DESCRIPTION OF THE INVENTION

Figure 1:
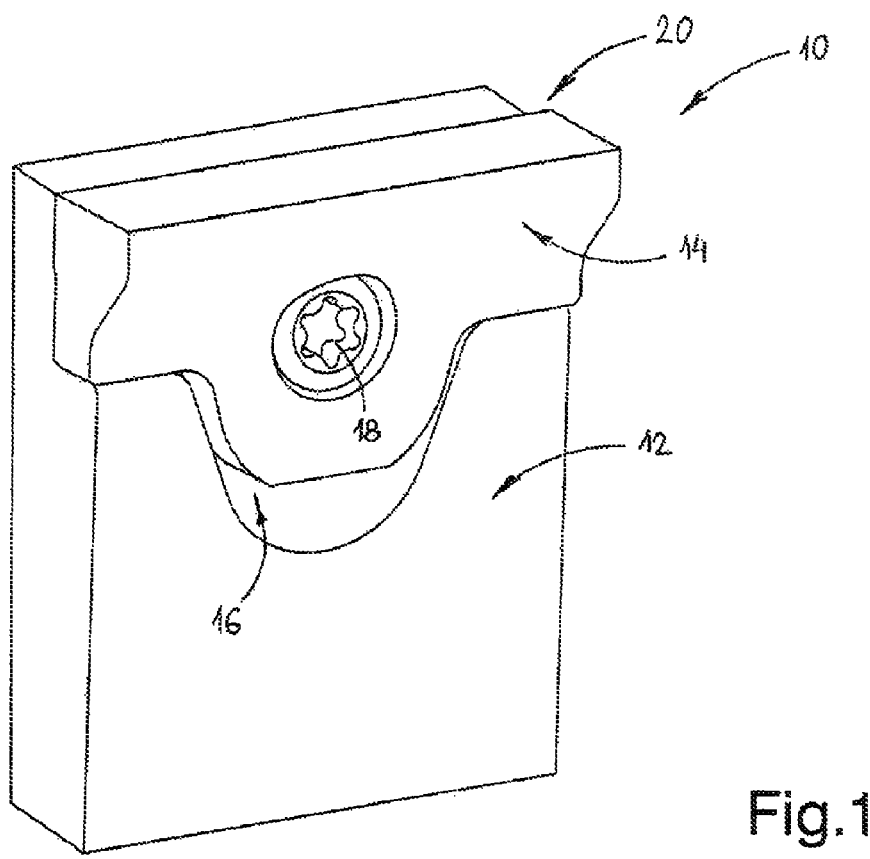
FIG. 1 is a perspective view of a cutting portion of a cutting tool in accordance with the present invention.

Attention is first drawn to FIG. 1 showing a preferred embodiment of a cutting portion of a cutting tool 10 in accordance with the present invention. The cutting tool 10 is designed to operate as a shaving tool. Nevertheless, the cutting tool 10 may be used for other cutting operations such as grooving, turning and slot milling. The cutting tool 10 comprises an insert holder 12 in the form of a rectangular blade with a cutting insert 14 retained in an insert pocket 16 by means of a retaining screw 18. The cutting insert 14 is typically manufactured by form-pressing and sintering carbide powders or by injection molding techniques.

The cutting tool 10 comprises a cutting portion 20 which includes the cutting insert 14, the insert pocket 16, and the immediate vicinity of the insert holder 12 adjacent the insert pocket 16. It should be noted that directional terms appearing throughout the specification and claims, e.g. "forward", "rear", "upper", "lower" etc., are used as terms of convenience to distinguish the location of various surfaces relative to each other. These terms are defined with reference to FIG. 1, however, they are used for illustrative purposes only, and are not intended to limit the scope of the appended claims.

Figure 2:
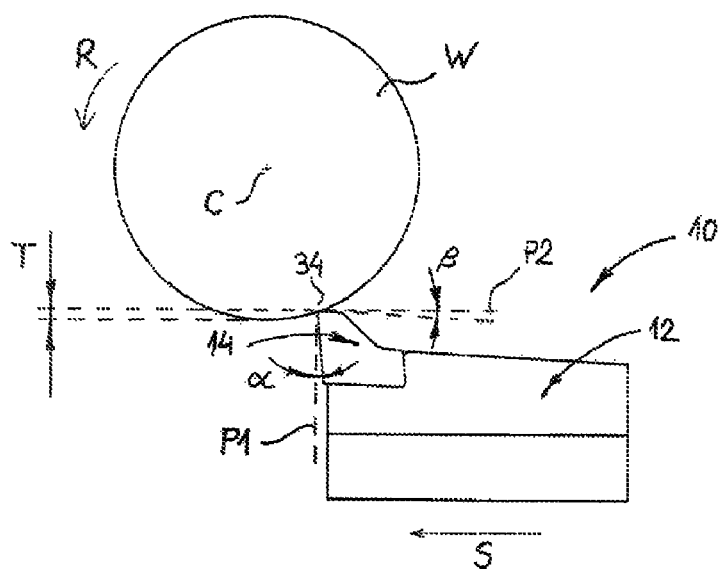
FIG. 2 is a side view of the cutting tool of FIG. 1 with respect to a workpiece being shaved.

FIG. 2 shows a side view of the cutting tool 10 in a typical relative orientation with respect to a workpiece W being shaved. As shown, when the workpiece W rotates anticlockwise with respect to a workpiece axis of rotation C, in a direction of rotation R as shown by the curved arrow, the cutting tool 10 moves leftward linearly in a direction shown by the straight arrow S, for shaving a thin chip, having a chip thickness T, from the workpiece W. The chip thickness T obtained in such a shaving process is typically very thin and, practically, it may be in the range from 0.005 mm to 0.1 mm.

Attention is drawn in addition to FIGS. 3 to 11. The construction of the cutting insert 14 will now be described. The cutting insert 14 comprises an insert forward surface 22, an insert rear surface 24 and an insert peripheral surface 26 extending therebetween. The insert peripheral surface 26 comprises two insert side surfaces 28 that extend between an insert upper surface 30 and an insert lower surface 32.

The intersection between the insert upper surface 30 and the insert forward surface 22 forms a forward cutting edge 34. In the orientation shown in FIG. 2, the insert upper surface 30 serves as a rake surface of the cutting insert 14 and the insert forward surface 22 serves as a relief surface of the cutting insert 14. However, the cutting tool 10 may be oriented in a different manner (not shown in the figures) with respect to the workpiece W. Thus, the insert forward surface 22 may serve as the rake surface of the cutting insert 14, in which case, the insert upper surface 30 may serve as the relief surface of the cutting insert 14. The forward cutting edge 34 may have any form according to the required shape of the machined workpiece W.

In the orientation shown in FIG. 2, the insert upper surface 30 is provided with a forward rake angle $\alpha$ with respect to a first reference plane P1 that passes through the forward cutting edge 34 and is perpendicular to the direction of linear motion S of the cutting tool 10. Typically, the forward rake angle $\alpha$ may be in the range from 0° to 15°.

The insert forward surface 22 is provided with a forward relief angle $\beta$ with respect to a second reference plane P2 that passes through the forward cutting edge 34 and is parallel to the direction of linear motion S of the cutting tool 10. Typically, the forward relief angle $\beta$ may be in the range from 0° to 10°.

Figure 9:
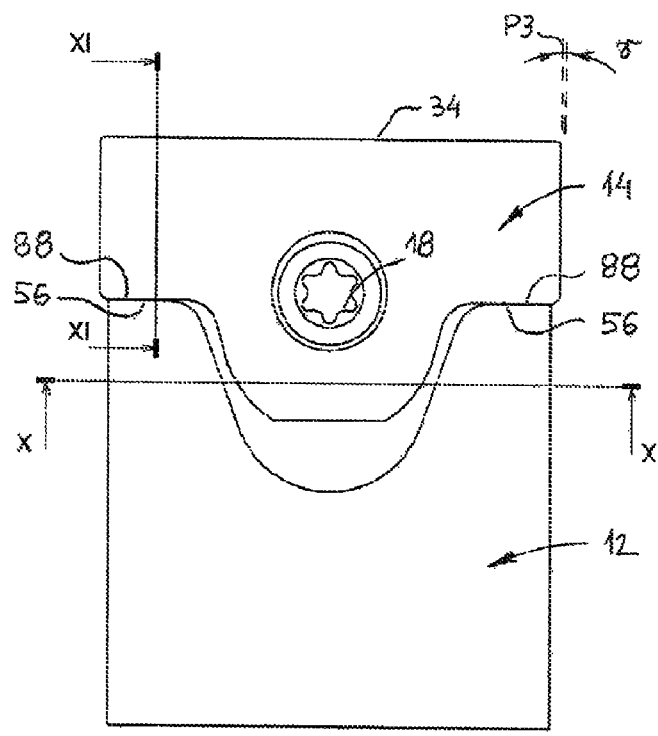
FIG. 9 is a front view of the cutting portion of the cutting tool of FIG. 1.

The intersection between the insert upper surface 30 and each of the insert side surfaces 28 forms a side cutting edge 36. If required, as shown in FIG. 9, each of the side cutting edges 36 may be provided with a side relief angle $\gamma$ with respect to a third reference plane P3. The third reference plane P3 passes through an intersection of the forward cutting edge 34 with the side cutting edge 36 and is perpendicular to the forward cutting edge 34. The size of the side relief angle $\gamma$ varies according to the cutting application of the cutting tool 10. Typically, the side relief angle $\gamma$ may be in the range from 0° to 5°.

The cutting insert 14 has a first dimension D1 taken between extremities of the insert side surfaces 28, a second dimension D2 taken between extremities of the insert upper surface 30 and the insert lower surface 32, and, a third dimension D3 taken between extremities of the insert forward surface 22 and the insert rear surface 24. Typically, the first dimension D1 is larger than the second dimension D2 and larger than the third dimension D3. Further typically, the second dimension D2 is larger than the third dimension D3. Generally, the size ratio between the first dimension D1 and the second dimension D2 is 1 to 2. According to a specific embodiment of the present invention, the size ratio between the first dimension D1 and the second dimension D2 is 1.5 to 2. Furthermore, the first dimension D1 is about three times larger than the third dimension D3.

The cutting insert 14 is provided with a through bore 38, having a bore axis A, that extends between the insert forward surface 22 and the insert rear surface 24.

Figure 4A:
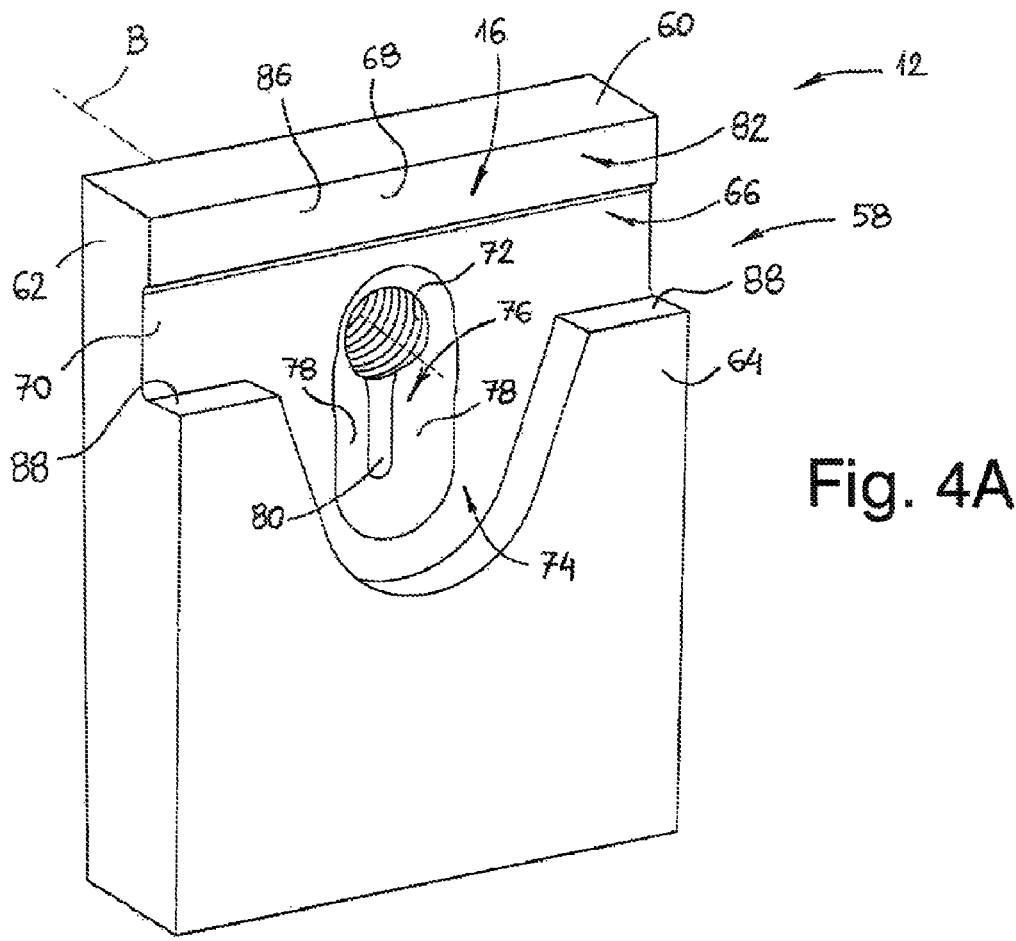
FIG. 4A shows a front perspective view of another embodiment of the insert holder.
Figure 4:
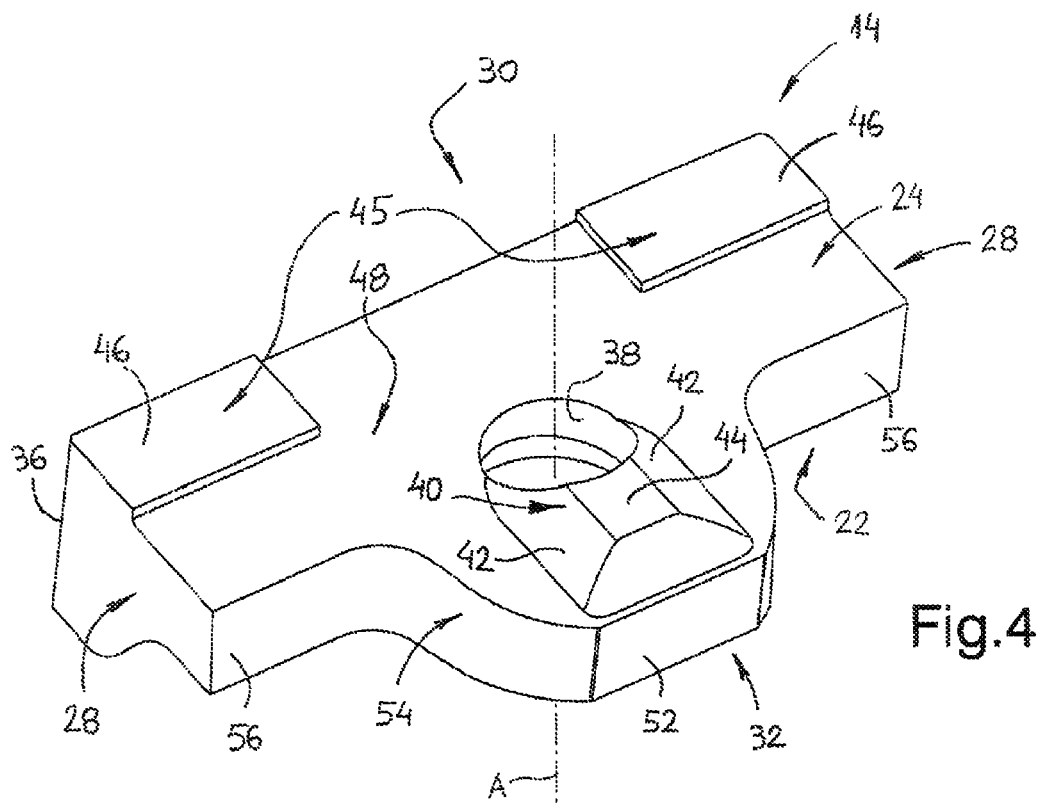
FIG. 4 is a bottom rear perspective view of the cutting insert of FIG. 3.
Figure 5:
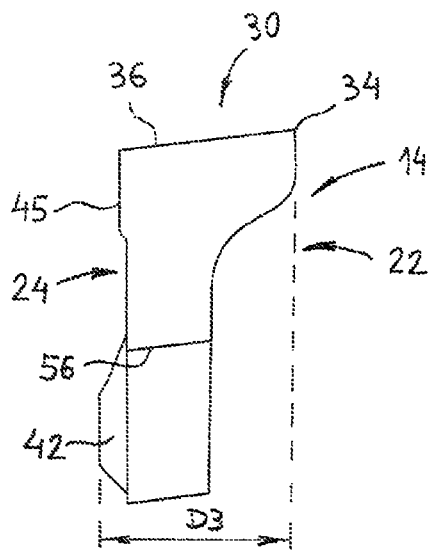
FIG. 5 is a side view of the cutting insert of FIG. 3.
Figure 8:
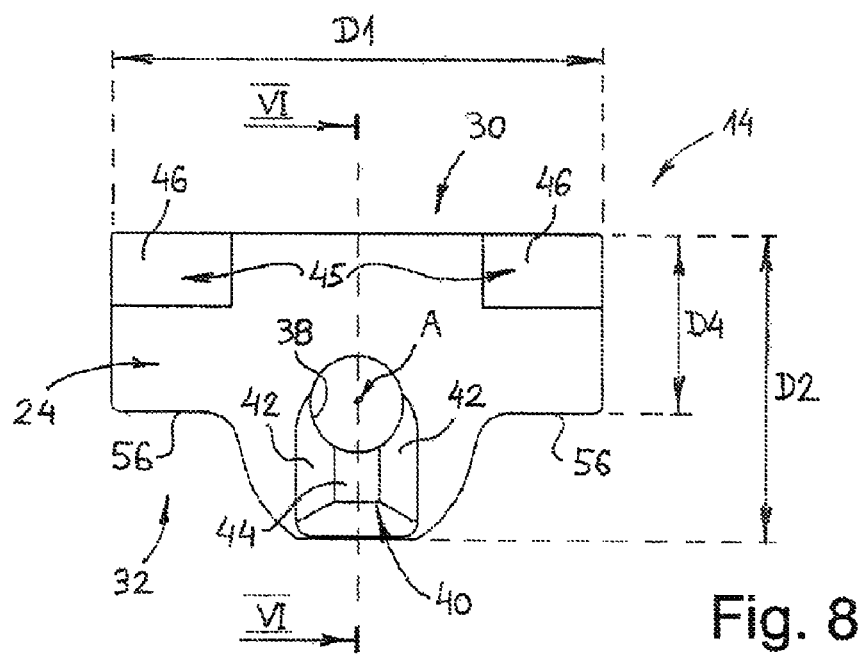
FIG. 8 is a rear view of the cutting insert of FIG. 3.
Figure 10:
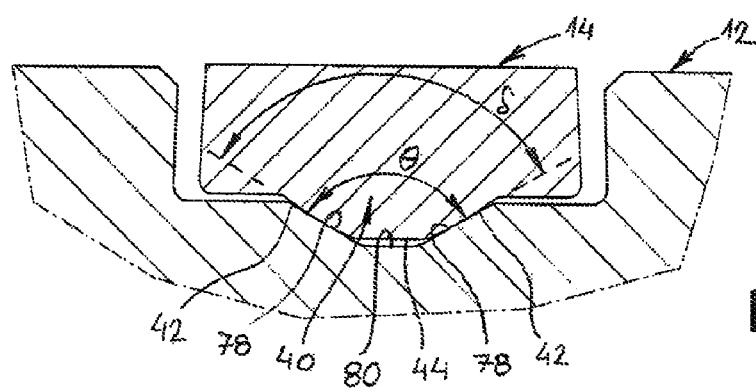
FIG. 10 is a cross-sectional view taken along line X-X in FIG. 9.

As best seen in FIGS. 4, 8 and 10, the insert rear surface 24 is provided with an insert protrusion 40 that constitutes an insert engaging element. According to other embodiments of the present invention, the insert engaging element may be an insert recess. The insert protrusion 40 extends from the through bore 38 in the opposite direction from the insert upper surface 30 and is elevated with respect to the insert rear surface 24 in the opposite direction from the insert forward surface 22.

The insert protrusion 40 is provided with a pair of first insert rear abutment surfaces 42 that are separated by an intermediate section 44. The intermediate section 44 may be a planar face and may be perpendicular to the bore axis A. The first insert rear abutment surfaces 42 are slightly convex as can be best seen in FIG. 10. Alternatively, the first insert rear abutment surfaces may be planar surfaces and may make an internal insert engaging angle $\delta$ with each other that practically may be in the range of 90° to 150°.

The insert rear surface 24 is further provided with a second insert rear abutment surface 45 which in one embodiment comprises a pair of second insert rear abutment surface portions 46 that are separated from the through bore 38 by an insert rear intermediate surface 48. The second insert rear abutment surface portions 46 are located distant from each other, adjacent the insert side surfaces 28, and adjacent the insert upper surface 30. Preferably, the second insert rear abutment surface portions 46 are co-planar. If desired, the second insert rear abutment surface portions 46 may be ground.

Figure 6:
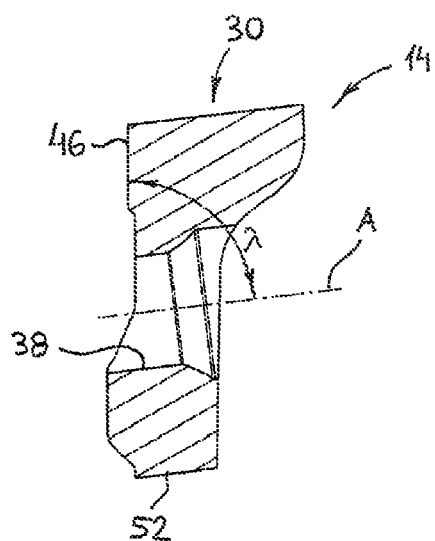
FIG. 6 is a cross-sectional view taken along line VI-VI in FIG. 8.
Figure 7:
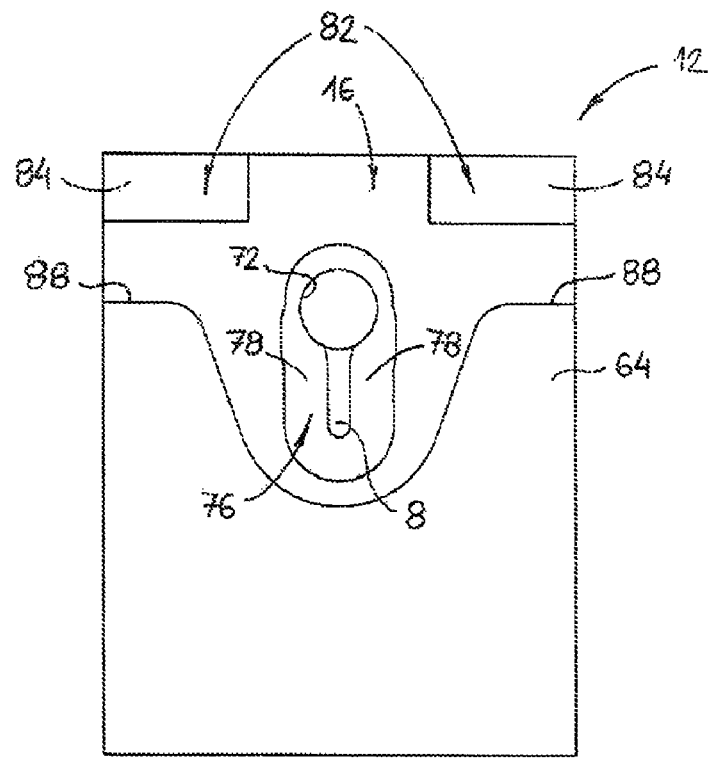
FIG. 7 is a front view of the cutting portion of the insert holder of FIG. 3.

As can be best seen in FIG. 6, the bore axis A is slanted at an internal bore slant angle $\lambda$ with respect to the second insert rear abutment surface portions 46. Typically, the bore slant angle $\lambda$ is in the range from 70° to 90°. According to a specific embodiment of the present invention, the bore slant angle $\lambda$ is 83°.

Figure 3:
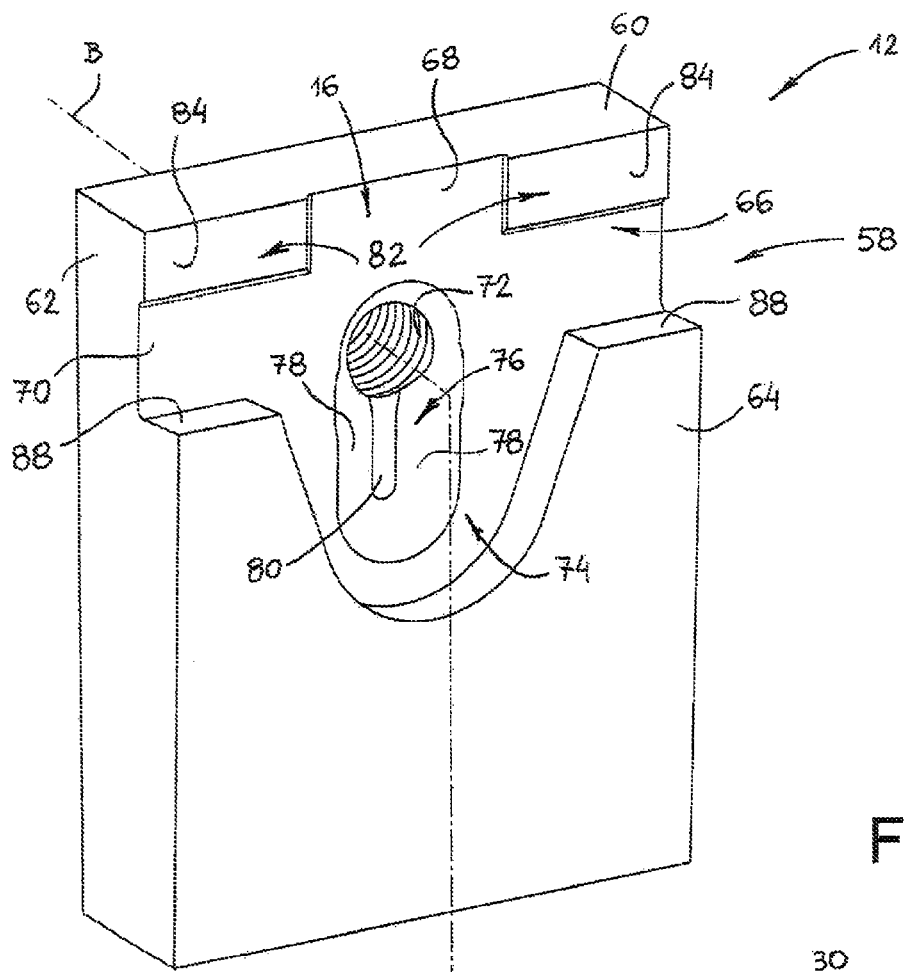
FIG. 3 is a front perspective view of the cutting portion of FIG. 1 with the cutting insert removed from its pocket.
Figure 3:
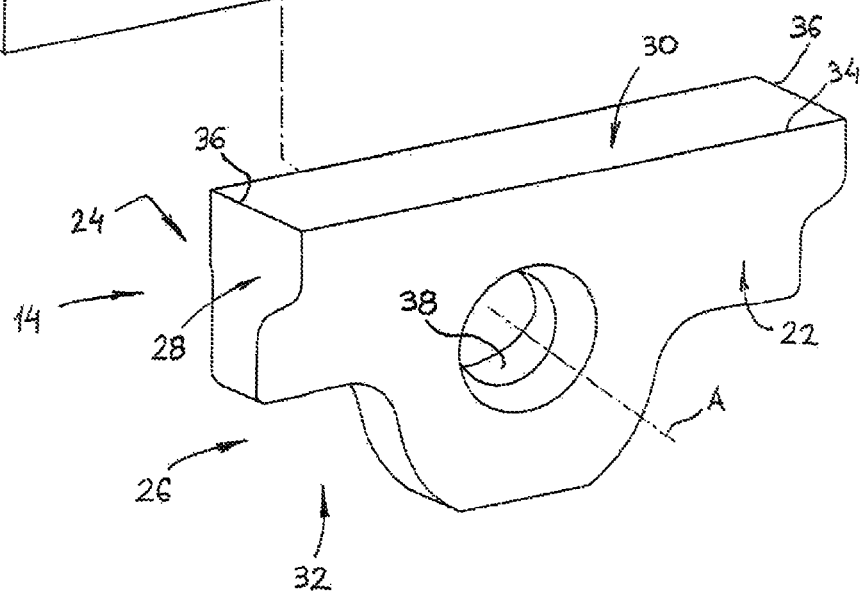
Figure 3A:
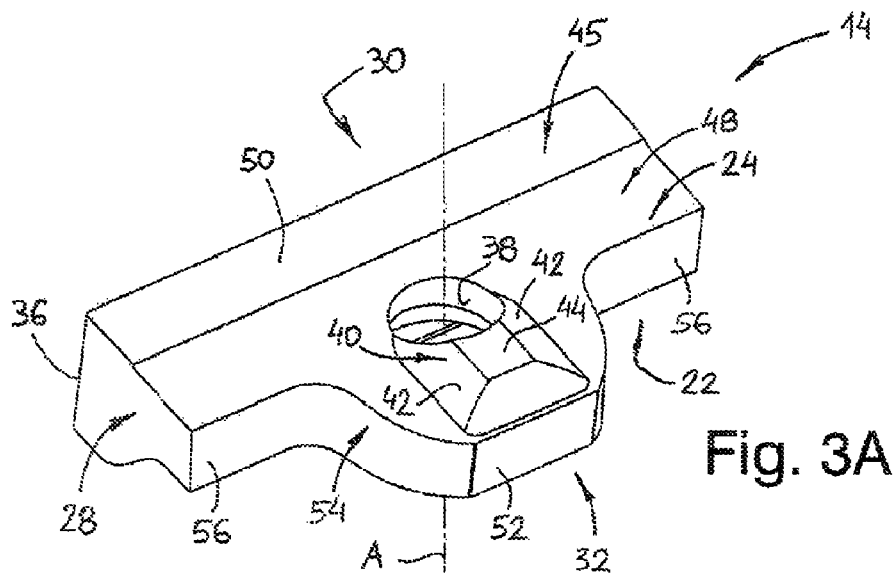
FIG. 3A shows a bottom rear perspective view of another embodiment of the cutting insert.

According to another embodiment of the present invention, seen in FIG. 3A, the second insert rear abutment surface 45 may comprise a single continuously extending insert rear abutment surface 50 that is slightly elevated from the insert rear intermediate surface 48 with respect to the insert forward surface 22. The continuously extending insert rear abutment surface 50 may extend across the width of the insert rear surface 24, adjacent the insert upper surface 30. If desired, the insert rear abutment surface 50 may be ground.

Figure 11:
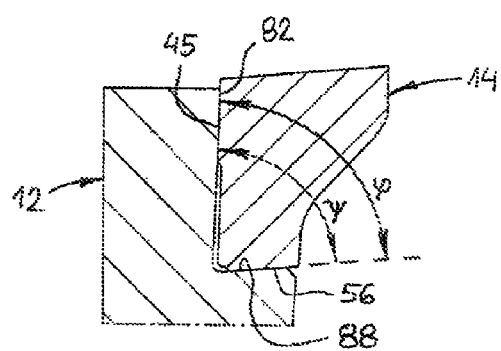
FIG. 11 is a cross-sectional view taken along line XI-XI in FIG. 9.

The insert lower surface 32 is provided with an insert lower central portion 52, adjacent the insert protrusion 40, and a pair of insert lower flanks 54 extending from the insert lower central portion 52 to the insert side surfaces 28. Each of the insert lower flanks 54 is provided with an insert lower abutment surface 56 that merges with the adjacent insert side surface 28. Preferably, the insert lower abutment surfaces 56 are co-planar. As seen in FIG. 11, the insert lower abutment surfaces 56 form an acute internal insert lower angle $\psi$ with the second insert rear abutment surface 45. The insert lower angle ψ may be in the range from 70° to 90°. According to a specific embodiment of the present invention, the insert lower angle ψ is 83°.

As shown in FIG. 8, the cutting insert 14 has a fourth dimension D4 taken between the insert lower abutment surfaces 56 and the insert upper surface 30. The fourth dimension D4 may be equal to the second dimension D2, however, it is advantageous if the fourth dimension D4 is substantially smaller than the second dimension D2. Thus, the size ratio between the fourth dimension D4 and the second dimension D2 may be in the range of 0.2 to 1. According to a preferred embodiment of the present invention, the size ratio between the fourth dimension D4 and the second dimension D2 may be in the range of 0.55 to 0.6.

Such a construction of the cutting insert 14 enables the insert lower abutment surfaces 56 to be closer to the insert upper surface 30 than the first insert rear abutment surfaces 42, thus providing the cutting insert 14 with improved seating location, stability and repeatability when seated within an insert pocket as will be described below. In addition, the fourth dimension D4 is large enough to enable several steps of grinding of the cutting insert 14 when it is worn. According to a specific design of the cutting insert 14, it may be subjected to ten steps of grinding before it has to be disposed of. Typically, cutting inserts are ground together as a batch in order to provide adequate repeatability when they are replaced with each other thus eliminating the need to individually adjust each one of them.

The construction of the insert pocket 16 will now be described. The insert pocket 16 is located in a front portion 58 of the insert holder 12 (see FIG. 3). The insert holder 12 has, in an upper portion thereof, a holder upper surface 60 that extends between two holder side surfaces 62. A front end of the insert holder is provided with a holder front surface 64 that extends between the holder side surfaces 62. The insert pocket 16 has a pocket rear surface 66. An upper portion 68 of the pocket rear surface 66 merges with the holder upper surface 60. Side extremities 70 of the pocket rear surface 66 merge with the adjacent holder side surface 62. A pocket threaded bore 72, having a threaded bore axis B, is formed in the pocket rear surface 66 and extends rearwardly into the insert holder 12.

A lower portion 74 of the pocket rear surface 66 is provided with a pocket recess 76 constituting a pocket engaging element. The pocket recess 76 extends from the pocket threaded bore 72 in the opposite direction from the holder upper surface 60. The pocket recess 76 has two spaced apart first pocket rear abutment surfaces 78 that may be separated by a recess intermediate section 80. As can be best seen in FIG. 10, the recess intermediate section 80 may be a planar face and may be perpendicular to the threaded bore axis B. The first pocket rear abutment surfaces 78 may be planar surfaces and may make an external pocket engaging angle θ with each other that may be in the range from 90° to 150°. According to a specific embodiment of the present invention, the pocket engaging angle θ is 120°.

The upper portion 68 of the pocket rear surface 66 is provided with a second pocket rear abutment surface 82 which in one embodiment comprises a pair of second pocket rear abutment surface portions 84. Each of the second pocket rear abutment surface portions 84 merges with the holder upper surface 60 and with the adjacent holder side surface 62. Preferably, the second pocket rear abutment surface portions 84 are co-planar. If desired, the second pocket rear abutment surface portions 84 may be ground.

According to another embodiment of the present invention, seen in FIG. 4A, the second pocket rear abutment surface 82 may comprise a continuously extending pocket rear abutment surface 86 that extends across the width of the pocket rear surface 66 proximate the holder upper surface 60. If desired, the continuously extending pocket rear abutment surface 86 may be slightly elevated with respect to its adjacent portion of the pocket rear surface 66.

The insert pocket 16 is further provided with pocket lower abutment surfaces 88 that extend transversely to the upper portion 68 of the pocket rear surface 66. The pocket lower abutment surfaces 88 may be advantageously located spaced apart at both sides of the pocket threaded bore 72. Each of the pocket lower abutment surfaces 88 merges with the adjacent holder side surface 62. Preferably, the pocket lower abutment surfaces 88 are co-planar and are slanted at a pocket lower abutment angle φ with respect to the second pocket rear abutment surface 82, as can be best seen in FIG. 11. Typically, the pocket lower abutment angle φ is acute thus providing the cutting insert a wedge effect when seated in its pocket. The pocket lower abutment angle φ may be in the range from 70° to 90°. According to a specific embodiment of the present invention, the pocket lower abutment angle φ is 83°.

The cutting insert 14 is retained in the insert pocket 16 by means of the retaining screw 18 in the following manner. The first insert rear abutment surfaces 42 abut the first pocket rear abutment surfaces 78, the second insert rear abutment surface 45 abuts the second pocket rear abutment surface 82, and the insert lower abutment surfaces 56 abut the pocket lower abutment surfaces 88. The retaining screw 18 passes through the through bore 38 and threadingly engages the pocket threaded bore 72.

Thus, a very accurate and stable position of the cutting insert 14 is obtained. Furthermore, when the cutting insert 14 is worn and is replaced by a new cutting insert, upon tightening the retaining screw 18 the new cutting insert 14 is brought into the desired position, thus, adequate repeatability is obtained and further adjustment of the cutting insert for performing a shaving operation is unnecessary, in contrary to prior art techniques.

The abutment between the cutting insert 14 and the insert pocket 16 is not limited to the described above and other combinations may be possible. In one embodiment, for example, the cutting insert 14 may be provided with the second insert rear abutment surface 45 comprising a pair of second insert rear abutment surface portions 46, as shown in FIG. 4, and the insert pocket 16 may be provided with a second pocket rear abutment surface 82 comprising a continuously extending pocket rear abutment surface 86, as shown in FIG. 4A.

In another embodiment, the cutting insert 14 may be provided with a second insert rear abutment surface 45 comprising a single continuously extending insert rear abutment surface 50, as shown in FIG. 3A, and the insert pocket 16 may be provided with a second pocket rear abutment surface 82 comprising a pair of second pocket rear abutment surface portions 84, as shown in FIG. 3.

In another embodiment, the cutting insert 14 may be provided with the second insert rear abutment surface 45 comprising a pair of second insert rear abutment surface portions 46, as shown in FIG. 4, and the insert pocket 16 may be provided with a second pocket rear abutment surface 82 comprising a pair of second pocket rear abutment surface portions 84, as shown in FIG. 3.

In another embodiment, the cutting insert 14 may be provided with a second insert rear abutment surface 45 comprising a single continuously extending insert rear abutment surface 50, as shown in FIG. 3A, and the insert pocket 16 may be provided with a second pocket rear abutment surface 82 comprising a continuously extending pocket rear abutment surface 86, as shown in FIG. 4A.

The pair of second insert rear abutment surface portions 46 may be elevated with respect to an adjacent region of the insert rear surface 24. Likewise, the continuously extending insert rear abutment surface 50 may be elevated with respect to an adjacent region of the insert rear surface 24.

The continuously extending pocket rear abutment surface 86 may be elevated with respect to an adjacent region of the pocket rear surface 66. Likewise, the pair of second pocket rear abutment surface portions 84 may be elevated with respect to an adjacent region of the pocket rear surface 66.

If desired, each of the abutment surfaces described above may be ground.

The first insert rear abutment surfaces 42 do not have to be spaced apart by the intermediate section 44. The intermediate section 44 may be omitted, as long as the first insert rear abutment surfaces 42 make an internal insert engaging angle δ with each other.

The first pocket rear abutment surfaces 78 do not have to be spaced apart by the intermediate section 80. The intermediate section 80 may be omitted, as long as the first pocket rear abutment surfaces 78 make an external pocket engaging angle θ with each other.

Although the present invention has been described to a certain degree of particularity, it should be understood that various alterations and modifications could be made without departing from the spirit or scope of the invention as hereinafter claimed.

For example, as already mentioned, the insert engaging element may be a recess instead of a protrusion. In which case, accordingly, the pocket engaging element may be a complementary protrusion.

The first pocket rear abutment surfaces do not have to be planar and they may have any desired shape provided for engaging with the first insert rear abutment surfaces.

The second insert rear abutment surface portions 46 may be provided with a recess therebetween. Likewise, the second pocket rear abutment surface portions 84 may be provided with a recess therebetween.

What is claimed is:

1. A cutting insert comprising:
    an insert forward surface, an opposing insert rear surface and an insert peripheral surface extending therebetween, the insert peripheral surface comprising two opposing insert side surfaces that extend between an insert upper surface and an opposing insert lower surface, the insert upper surface and the insert lower surface forming insert end surfaces;
    a through bore having a bore axis and extending between the insert forward and rear surfaces;
    a forward cutting edge formed at an intersection of the insert upper surface and the insert forward surface; wherein:
    the insert lower surface comprises:
        an insert lower central portion, and
        a pair of insert lower flanks extending from the insert lower central portion to the insert side surfaces, each of the insert lower flanks being provided with an insert lower abutment surface; and
    the insert rear surface comprises:
        two spaced apart first insert rear abutment surfaces which are located closer to the bore axis than the insert lower central portion and extend in a direction between the insert end surfaces, and
        a second insert rear abutment surface located between the through bore and the insert upper surface.

2. The cutting insert according to claim 1, wherein:
    the cutting insert has a first dimension taken between extremities of the insert side surfaces,
    a second dimension taken between extremities of the insert upper surface and the insert lower surface,
    a third dimension taken between extremities of the insert forward surface and the insert rear surface,
    a fourth dimension taken between the insert lower abutment surfaces and the insert upper surface, and
    a size ratio between the fourth dimension and the second dimension is in the range of 0.2 to 1.

3. The cutting insert according to claim 2, wherein the size ratio between the fourth dimension and the second dimension is in the range of 0.55 to 0.6.

4. The cutting insert according to claim 2, wherein the size ratio between the first dimension and the third dimension is in the range of 2.5 to 3.5.

5. The cutting insert according to claim 2, wherein the size ratio between the first dimension and the second dimension is in the range of 1 to 2.

6. The cutting insert according to claim 1, wherein the two first insert rear abutment surfaces make an insert engaging angle with each other.

7. The cutting insert according to claim 6, wherein the insert engaging angle is obtuse.

8. The cutting insert according to claim 7, wherein the insert engaging angle is in the range from 90° to 150°.

9. The cutting insert according to claim 1, wherein the second insert rear abutment surface comprises two spaced-apart co-planar portions.

10. The cutting insert according to claim 1, wherein the second insert rear abutment surface is separated from the through bore by an insert rear intermediate surface.

11. The cutting insert according to claim 1, wherein the second insert rear abutment surface comprises a single continuously extending surface which extends across a width of the insert rear surface.

12. The cutting insert according to claim 11, wherein the second insert rear abutment surface is elevated from an insert rear intermediate surface with respect to the insert forward surface, the insert rear intermediate surface being located between the second insert rear abutment surface and the insert lower surface.

13. The cutting insert according to claim 12, wherein the second insert rear abutment surface is ground.

14. The cutting insert according to claim 1, wherein each of the insert lower abutment surfaces merges with an adjacent insert side surface.

15. The cutting insert according to claim 1, wherein the insert lower abutment surfaces are co-planar.

16. The cutting insert according to claim 1, wherein the insert lower abutment surfaces form an acute internal insert lower angle with the second insert rear abutment surface.

17. A cutting tool comprising an insert holder having an insert pocket with a cutting insert seated therein, wherein:
    the insert holder comprises:
        a holder upper surface connecting at opposite ends to a pair of holder side surfaces;
    the insert pocket comprises:
        a pocket rear surface, an upper portion of the pocket rear surface merging with the holder upper surface, side extremities of the pocket rear surface merging with the holder side surfaces, a pocket threaded bore formed in the pocket rear surface and extending rearwardly into the insert holder, the pocket threaded bore having a threaded bore axis, a pocket engaging element formed in a lower portion of the pocket rear surface and extending in an opposite direction from the holder upper surface, the pocket engaging element having two spaced apart first pocket rear abutment surfaces, a second pocket rear abutment surface formed in an upper portion of the pocket rear surface, the second pocket rear abutment surface merging with the holder upper surface and with an adjacent holder side surface, spaced apart pocket lower abutment surfaces located at opposite sides of the pocket threaded bore, each of the pocket lower abutment surfaces extending transversely to the upper portion of the pocket rear surface and merging with the holder side surfaces;

the cutting insert comprises:
an insert forward surface, an opposing insert rear surface and an insert peripheral surface extending therebetween, the insert peripheral surface comprising two opposing insert side surfaces that extend between an insert upper surface and an opposing insert lower surface, the insert upper surface and the insert lower surface forming insert end surfaces;

a through bore having a bore axis and extending between the insert forward and rear surfaces;

a forward cutting edge formed at an intersection of the insert upper surface and the insert forward surface; wherein:

the insert lower surface comprises:
an insert lower central portion, and
a pair of insert lower flanks extending from the insert lower central portion to the insert side surfaces, each of the insert lower flanks being provided with an insert lower abutment surface; and the insert rear surface comprises:
two spaced apart first insert rear abutment surfaces which are located closer to the bore axis than the insert lower central portion and extend in a direction between the insert end surfaces, and
a second insert rear abutment surface located between the through bore and the insert upper surface;

the first insert rear abutment surfaces abut the first pocket rear abutment surfaces, the second insert rear abutment surface abuts the second pocket rear abutment surface, the insert lower abutment surfaces abut the pocket lower abutment surfaces, and a retaining screw passes through the through bore and threadingly engages the pocket threaded bore.

18. The cutting tool according to claim 17, wherein the pocket engaging element is a pocket recess.

19. The cutting tool according to claim 17, wherein the first pocket rear abutment surfaces make a pocket engaging angle with each other.

20. The cutting tool according to claim 19, wherein the pocket engaging angle is obtuse.

21. The cutting tool according to claim 20, wherein the pocket engaging angle is in the range from 90° to 150°.

22. The cutting tool according to claim 17, wherein the second pocket rear abutment surface comprises two spaced-apart co-planar portions.

23. The cutting tool according to claim 17, wherein the pocket lower abutment surfaces are co-planar.

24. The cutting tool according to claim 17, wherein the pocket lower abutment surfaces are slanted at an acute pocket lower abutment angle with respect to the second pocket rear abutment surface.

25. The cutting tool according to claim 24, wherein the pocket lower abutment angle is in the range from 70° to 90°.

* * * * *